(12) United States Patent
Amador et al.

(10) Patent No.: US 11,566,328 B2
(45) Date of Patent: Jan. 31, 2023

(54) AMORPHOUS THIN FILMS AND METHOD OF MAKING

(71) Applicant: Oregon State University, Corvallis, OR (US)

(72) Inventors: Jennie M. Amador, Corvallis, OR (US); Douglas A. Keszler, Corvallis, OR (US); James Sommers, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 16/904,365

(22) Filed: Jun. 17, 2020

(65) Prior Publication Data

US 2020/0392628 A1 Dec. 17, 2020

Related U.S. Application Data

(60) Provisional application No. 62/862,520, filed on Jun. 17, 2019.

(51) Int. Cl.
*C09D 1/00* (2006.01)
*C23C 18/12* (2006.01)

(52) U.S. Cl.
CPC ............ *C23C 18/1208* (2013.01); *C09D 1/00* (2013.01); *C23C 18/1241* (2013.01)

(58) Field of Classification Search
USPC .......................................... 106/286.1, 286.8
See application file for complete search history.

(56) References Cited

U.S. PATENT DOCUMENTS

2012/0217681 A1\* 8/2012 Zieba ................ C04B 35/62236
264/465

FOREIGN PATENT DOCUMENTS

CN 107400846 A \* 11/2017 ......... C09K 11/7787

\* cited by examiner

*Primary Examiner* — James E McDonough
(74) *Attorney, Agent, or Firm* — Klarquist Sparkman, LLP

(57) ABSTRACT

Aqueous solutions of halogenides (oxyhalides) of zirconium and hafnium (M) with values of $\alpha=X/M$ near one, for X=Cl, Br and I form amorphous solids or glasses, designated as M,X, in contrast to important crystalline oxyhalide end members with $\alpha=2$ (designated as MOX). The present disclosure describes methods for producing amorphous thin films comprising halogenides upon evaporation, and provides some measured physical properties, with attention to compositions for $\alpha<2$. The value of a below which only glasses are formed is about one for oxychlorides and oxybromides of both Zr and Hf. The chemical formulas for all the halogenide thin films prepared as noted above can be written as a function of the single parameter $\alpha$, according to $M(OH)_{4-\alpha}X_\alpha \cdot (4\alpha-1)H_2O$. This is valid for e.g., crystalline zirconium oxychloride octahydrate, and for the glassy solids found for $\alpha<2$ and down to the onset of hydrolysis, $\alpha \approx 0.5$. Thin films made by the disclosed methods are highly dense (90% of theoretical crystal density), extremely smooth (rms<0.4 nm), and highly transparent in the visible spectrum, >90%. Such thin films are useful as alkali diffusion barriers.

14 Claims, 9 Drawing Sheets

AMORPHOUS THIN FILMS AND METHOD OF MAKING

CROSS REFERENCE TO RELATED APPLICATION

This application claims the benefit under 35 U.S.C. § 119(e) of the Jun. 17, 2019 earlier filing date of U.S. provisional patent application No. 62/862,520. U.S. provisional patent application No. 62/862,520 is incorporated herein by reference in its entirety.

GOVERNMENT SUPPORT

This invention was made with government support under Award No. CHE-1606982 awarded by the National Science Foundation. The government has certain rights in the invention.

FIELD

This disclosure concerns compositions and methods for depositing amorphous thin films from aqueous precursors, and more particularly concerns compositions comprising halogenides or nitrates of zirconium, hafnium or both.

BACKGROUND

Zirconium oxychloride (ZOC, $ZrOCl_2 \cdot 8H_2O$) is the basis of essentially all practical chemistry concerning zirconium-based materials. Zirconium oxychloride is extracted from zircon sand, $ZrSiO_4$, either by carbochlorination or caustic fusion. It may be used as a feedstock for separation of hafnium from zirconium by liquid-liquid extraction, from which hafnium oxychloride (HOC) may be obtained by processes well known to those skilled in the art. Both ZOC and HOC have Cl/M ratios, $\alpha$, equal to two. Similar formulas and properties are found for corresponding oxybromides and oxyiodides, collectively referred to as halogenides. Zirconium halogenides with $\alpha$ near one for Cl, Br and I are only sparsely described in the literature, mainly as unpublished results by Blumenthal, resulting in a considerable and surprising gap with respect to basic synthesis methods and property investigations for these materials.

Thin films of halogenides of zirconium and hafnium can be used in a number of applications that require uniform coverage of a high surface area substrate. For example, some embodiments can be used in electrochromic windows or photovoltaic panels. Currently, coating large surface areas on glass substrates is done by physical vapor deposition, which require a high vacuum environment, which substantially increases the process expense.

Physical vapor deposition techniques are also conformal, amplifying any imperfection or blemish in the deposition substrate with each successive deposition layer while simultaneously necessitating thicker films to compensate for those imperfections, again adding cost and reducing performance. Further, the post-annealing typically employed by physical vapor deposition techniques often results in crystallization of the deposited thin film. In some applications, crystallization is desired, but for other applications, an amorphous or glassy material is preferred.

Therefore, a need remains for deposition methods that are less expensive, robust to substrate imperfections, and which allow for the deposition of amorphous thin films.

SUMMARY

To that end the present disclosure describes synthesis methods for basic halogenides of zirconium and hafnium. More particularly, the present disclosure describes methods for making thin films of halogenides of zirconium and hafnium from aqueous solutions that are highly dense (>90% theoretical), extremely smooth (preferably where $R_q$<1 nm), and demonstrate optical transparency >90% in the visible range, all at a significant reduction in cost as compared to physical vapor deposition. The primary application contemplated for these thin films is an alkali diffusion barrier layer (primarily $ZrO_2$). They are also known as high-k dielectrics (primarily $HfO_2$), and these compositions may further be useful as corrosion barriers and metal passivation layers.

Certain disclosed embodiments concern solutions useful for forming metal halogenides, and thin films comprising such halogenides. These solutions and thin films can be further processed and incorporated with other components to form useful electronic and optic devices, as will be understood by a person of ordinary skill in the art. Disclosed solution embodiments may comprise an acid, such as a hydrohalic acid, including hydrochloric acid, hydrobromic acid, or hydroiodic acid, or nitric acid, and a metal halogenide, or combinations of metal halogenides. Certain exemplary embodiments particularly concern zirconium oxychloride and/or hafnium oxychloride. The solution may further comprise ammonium hydroxide.

The halogenide may have a formula $M(OH)_{4-\alpha}X_\alpha \cdot (4\alpha-1)H_2O$ where M=hafnium, zirconium, or combinations thereof (zirconium may naturally include up to 2% hafnium); X is F, Cl, Br or I; and $\alpha$ is from greater than 0 to 2. For certain embodiments, X is Cl, and $\alpha$ is 0.6 to 1.2. Certain particular compounds have a halogenide structure comprising 4 linked tetramers where $\alpha$ is 1; or a halogenide structure comprising 3 linked tetramers where $\alpha$ is 1.2.

Solution-deposited films comprising zirconium oxide, hafnium oxide, or a combination thereof, also are described. For certain embodiments, the film density is greater than 80% of the theoretical maximum density. The film also may be substantially amorphous, or partially or substantially crystalline.

A method for forming thin films and processing thin films is disclosed. One exemplary method embodiment comprises preparing a solution comprising an acid and a metal halogenide or combinations of metal halogenides; applying the solution to a substrate to form a film; and heat processing, such as annealing, the film. The solution may further comprise ammonium hydroxide. The substrate may be any suitable substrate, such as a hydrophilic substrate, with a particular substrate comprising ozone-treated silicon. For certain embodiments, a suitable annealing time is between approximately 15 minutes and approximately 1 hour, and a suitable annealing temperature is at or below 500° C., such as 300° C. to 500° C. Films produced by the method are quite smooth, and may have a roughness, Rq, of 1 nm or less, with certain embodiments having a roughness of 0.2 nm to 0.4 nm and a thickness of 10 nm to 100 nm.

Disclosed embodiments also concern a method for making an electronic or optic device. One disclosed embodiment comprises providing a solution comprising an acid and a metal halogenide; applying the solution to a substrate to form a film; heat processing, such as annealing, the film; and assembling a device incorporating the film.

BRIEF DESCRIPTION OF THE DRAWINGS

FIG. 5 provides the number of water molecules, n, for M,X glasses versus a.

FIG. 6 provides molar volume, cm³, of M,X glasses versus a.

DETAILED DESCRIPTION

I. Terms

Figure 1:
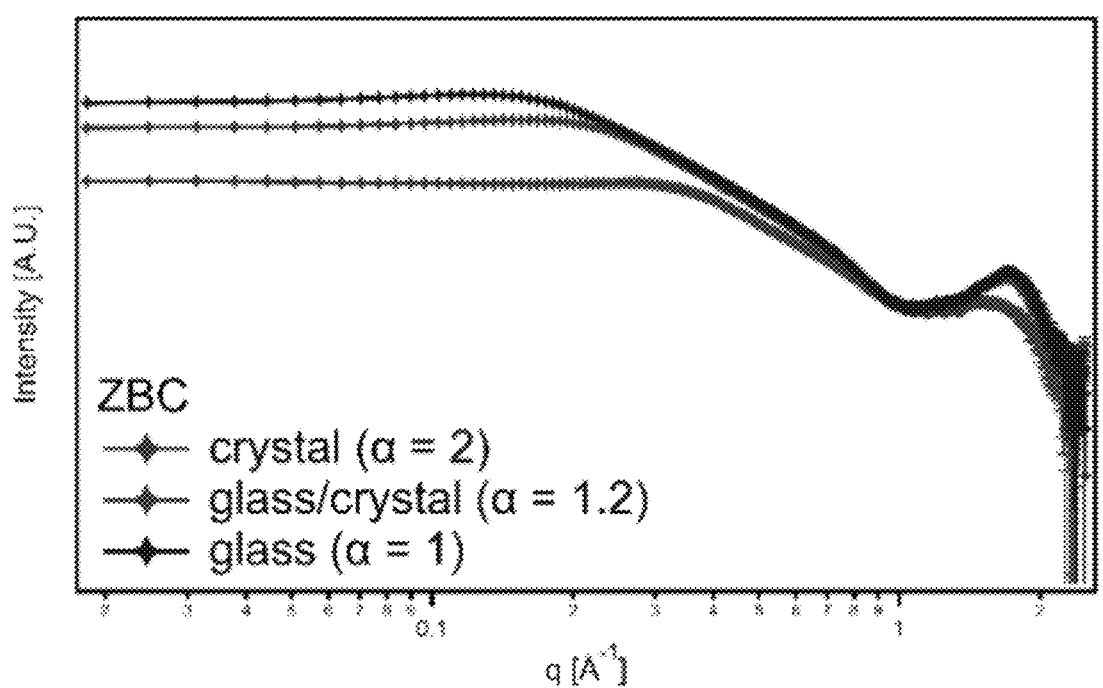
FIG. 1 is a scattering curve, intensity (A.U.) versus (Å$^{-1}$), for ZBC systems exhibiting an increase in cylindrical length from crystal to glass formers.

The following explanations of terms and abbreviations are provided to better describe the present technology and to guide those of ordinary skill in the art to practice disclosed embodiments.

As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood by a person of ordinary skill in the art to which this disclosure pertains. Although methods and materials similar or equivalent to those described herein can be used to practice or test the present disclosure, suitable methods and materials are described below. The materials, methods, and examples are illustrative only and are not limiting. Other features of the disclosure are apparent from the detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Roughness Average, Ra, is the arithmetic average of the absolute values of the profile heights over an evaluation length or area.

RMS Roughness is the root mean square average of film heights over an evaluation length or area. A thin film made by the disclosed method typically has a substantially smooth surface, such as a surface having an RMS roughness value of from greater than 0 to 10 nm or less, or greater than 0 to 3 nm or less, such as 2 nm or less, preferably less than 1 nm, and even more preferably less than 0.5 nm, with certain exemplary embodiments having roughness values of 0.2 nm, 0.3 nm or 0.4 nm. RMS roughness values may be determined using atomic force microscope (AFM) measurements acquired over a selected area, such as a 1×1 µm² area.

Thin, as used herein with respect to a thin film or thin layer, refers to a film or layer typically having a film thickness or layer thickness of from greater than zero to 3 µm (3,000 nm), from greater than zero to 2 µm (2,000 nm), from greater than zero to 1 µm (1,000 nm), such as from greater than zero to 500 nm, such as from greater than zero to 300 nm, or from greater than zero to 100 nm, such as 10 nm, 20 nm, 30 nm, 40 nm, 50 nm, 60 nm, 70 nm, 80 nm, 90 nm or 100 nm.

Described herein is a method of making high quality amorphous thin films of halogenides of zirconium, hafnium, or mixed zirconium and hafnium, from aqueous precursors. Throughout the document, the words "amorphous" and "glassy" are used interchangeably and are intended to convey the same physical meaning: a material that lacks long range order and is not substantially crystalline. One skilled in the art will recognize that a material may be predominantly amorphous, as confirmed by x-ray diffraction, while still having small regions at the atomic scale that resemble the crystalline unit cell. The following description and corresponding figures are intended to assist in the understanding of the disclosure using a number of exemplary embodiments without limiting the scope of the invention to such exemplary embodiments.

Prior to the elucidation of the crystal structure of ZOC by Clearfield and Vaughan, which made evident the existence of the tetrameric cation of Zr atoms linked by bridging hydroxide ions, it was common to name oxygenated Zr compounds as "zirconyl", and to write formulas using the group $ZrO^{2+}$ on the assumption of the existence of it, or a similar, free cation.

Accordingly, formulas for the zirconium halogenide glasses from that era were typically written as $ZrO(OH)Cl.nH_2O$. From the work of Clearfield, one might more properly express ZOC as $Zr(OH)_2Cl_2.7H_2O$, instead of the customary $ZrOCl_2.8H_2O$. The present disclosure provides support for writing the glass formula for α=1 as $Zr(OH)_3Cl.3H_2O$.

II. Halogenides

Certain disclosed embodiments of the present disclosure concern halogenides having a formula $M(OH)_{4-\alpha}X_\alpha.(4\alpha-1)H_2O$. With reference to this formula, particular embodiments have M=hafnium or zirconium; X is a halide, such as F, Cl, Br or I, with certain disclosed exemplary embodiments concerning X=Cl. With still further reference to this formula, $\alpha$ is from greater than 0 to at least 2, with certain embodiments having $\alpha$=greater than 0.5 to less than 2, such as 0.5 to 1.5, such as greater than 0.6 to 1.2. For $\alpha$ values 0.5 or less, insoluble particulates of hydroxide/oxide tend to form as opposed to forming halogenides. And, for compounds where $\alpha$ approaches 2, such compounds are typically crystalline. Accordingly, certain disclosed compounds according to the present invention are glass (amorphous) compounds having $\alpha$ greater than 0.5 and 1.2 or less. The glass-forming solutions ($\alpha$=1) indicate longer lengths corresponding to four linked tetramers. The mixed crystal/glass forming systems ($\alpha$=1.2) contain an intermediate species of three linked tetramers.

ZOC and HOC, with $\alpha$=2, are crystalline phases. In contrast, glass formation occurs for $\alpha \approx 1$. Compositions were produced to determine the value $\alpha_{crit\ 2}$, the lowest value at which the crystalline and glass phases coexist. Crystals of the familiar needle growth habit of ZOC were readily discerned, embedded in a glass matrix. Table 1 below was compiled by determining as with crystal+glass and glass only.

TABLE 1

Values of $\alpha_{crit\ 2}$ for Various M, X

| M, X | $\alpha$, ± 0.03 |
| --- | --- |
| Zr, Cl (ZBC) | 0.99 |
| Zr, Cl (dialysis) | 1.16 |
| Hf, Cl (dialysis) | 1.16 |
| Zr, Br (ZBC) | 0.98 |
| Hf, Br (MOH + dialysis) | 1.13 |

It appears that $\alpha_{crit\ 2}$ of ZBC samples are indeed somewhat lower than for dialysis of ZOC/HOC. Thus, two samples from ZBC at $\alpha$=1.04 and 1.00 were found to have a small fraction of crystals, but two samples from different dialysis runs produced only glass, with as of 1.12 and 1.09. There may be some difference in nucleation in the vicinity of $\alpha_{crit}$ By the ZBC method, dissolution times become progressively longer with lower $\alpha$, leaving turbid solutions. Good glass samples have been obtained for $\alpha \approx 0.68$. This parallels behavior for slow neutralization of ZOC with base, wherein initial precipitation-redissolution shifts toward persistent insolubility, and eventual gel formation, with increasing base addition (effectively decreasing $\alpha$).

SWAXS analysis of all crystal- and glass-forming solutions indicate formation of cylindrical-shaped particles. The scattering data could not be modeled as Zr tetrameric units but instead as chains of tetramers. The radius of the cylindrical fit agrees with the radius of the tetrameric unit while the length corresponds to additional tetramers linked in a linear fashion. The data were analyzed with the pair distance distribution function (PDDF) to provide further evidence for chain formation. PDDF provides a maximum linear dimension of the scattering species which agrees with the length of the cylindrical model. All modeled values can be found in Table 2. Similar results were found for Zr solutions prepared from ZOC by dialysis, and also for Hf solutions, which are not shown.

TABLE 2

Modeled Values from PDDF Analysis and Modeling II in Irena Macros

| ZBC | Rg - PDDF (Å) | Max Linear Ext - PDDF (Å) | Radius from cylindrical fit (Å) | Length from cylindrical fit (Å) | H (distance between clusters, Å) | Φ (# of nearest neighbors) |
| --- | --- | --- | --- | --- | --- | --- |
| $\alpha$ = 2.0 (crystal) | 3.6 | 10 | 3.0 | 10.3 | 15.5 | 2.3 |
| $\alpha$ = 1.2 | 5.9 | 17 | 3.6 | 16.5 | 25.4 | 0.8 |
| $\alpha$ = 1.0 (glass) | 7.7 | 24 | 3.9 | 22.2 | 32.5 | 0.8 |
| $\alpha$ = 1.0 thermal | | | 13.2 Å spherical radius | | | |
| Simulated Octamer | 4.3 | 13.5 | 2.7 | 13.5 | — | — |

The Zr crystal forming solution ($\alpha$=2) contains scattering species in agreement with cylindrical species composed of two tetramers linked side by side. The glass forming solutions ($\alpha$=1) indicate longer lengths corresponding to four linked tetramers. The mixed crystal/glass forming systems ($\alpha$=1.2) contain an intermediate species of three linked tetramers. From crystal forming to glass forming, there is a distinct trend of longer chain formation (See FIG. 1).

Figure 2:
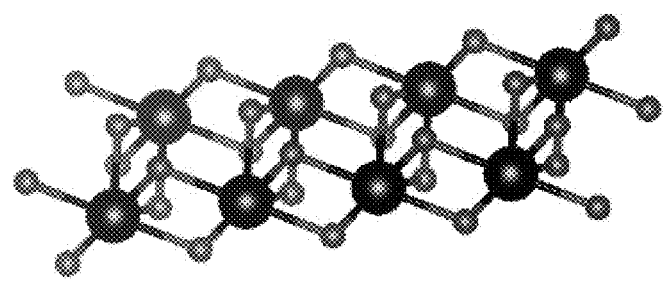
FIG. 2 provides a model for two tetrameric units linked by bridging hydroxides.

The solution with table entry "thermal" from Table 2 stands out by indicating extensive polymerization. The SWAXS analysis of this solution indicated a polydisperse mixture, primarily composed of spherical nanoparticles with radius of 13.2 Å. Converting the implied radius of 13.2 Å into a Zr-number using the contracted crystallographic formula unit volume of about 280 Å$^3$*(110/170.4)=181 Å$^3$, indicates these "spheres" contain about 53 such units. These findings suggest a side-ways linking of tetramer units into di-, tri- and quadri-mers, containing 8, 12 and 16 Zr atoms, using only one parameter, the Zr—Zr crystallographic distance (through bridging hydroxide pairs) of 3.55 Å. A model for two tetrameric units linked by bridging hydroxides is provided by FIG. 2.

Figure 3:
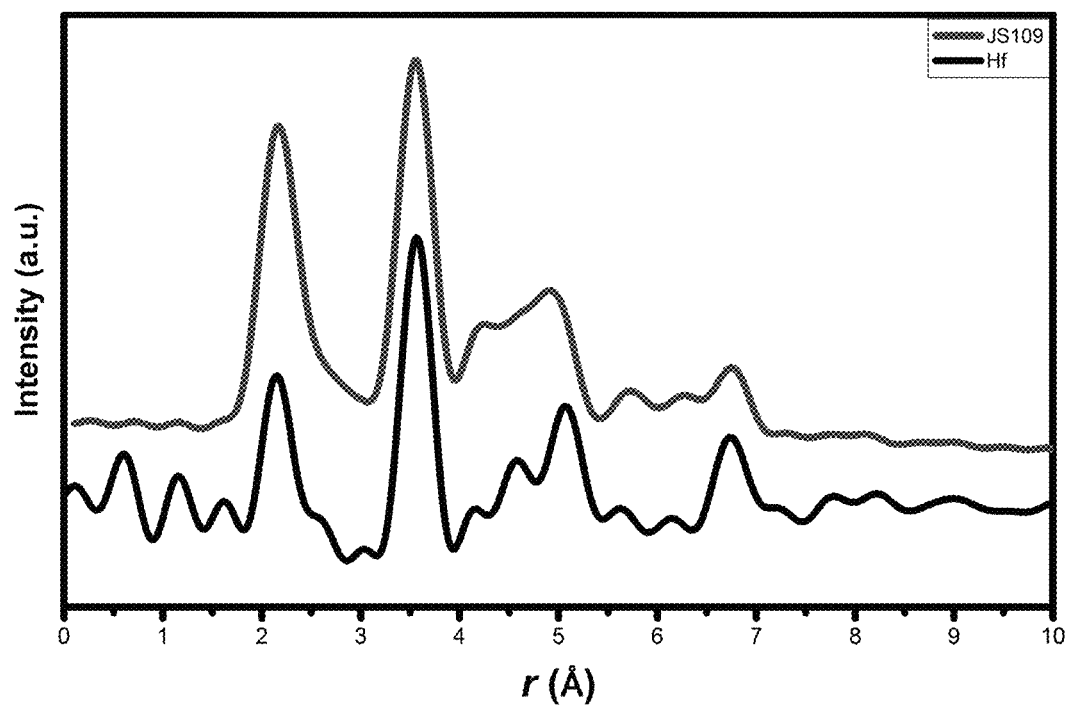
FIG. 3 provides PDF data for Hf,Cl glass, with α=1.0.

Pair Distribution Function (PDF) measurements of glass samples were obtained. Particularly, powdered samples with $\alpha$=1.2 for Zr,Cl, a solid disk casting with $\alpha$=0.8 for Zr,Cl and with $\alpha$=1.0 for Hf,Cl were examined. The glasses were very similar and the results for Hf,Cl are discussed here. The data from these samples can be seen in FIG. 3. Assignments of the peaks is aided by the high-energy x-ray scattering work on perchloric acid solutions of HOC. The existence of the tetrameric motif is made clear by inspection of these data. The peak at 2.14 Å is representative of the Hf—O bond length and the peak at 3.55 Å is representative of the Hf—Hf distance for adjacent Hf atoms within the tetramer; and also, the Hf—Hf distance across the tetramer at ≈√2·3.55=5.03 Å. Past ~7 Å the glassy solids do not show significant peaks, indicating that there is no orientational or translational symmetry between tetramers. The peak at 3.55 Å is much more intense in the glass. This suggests that in addition to Hf—Hf scattering, the peak contains strong contribution due to Hf—Cl.

Figure 4:
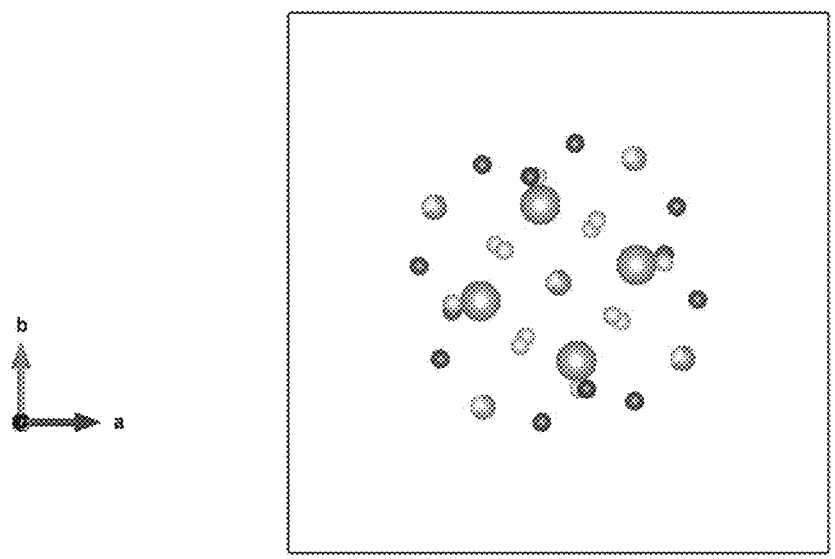
FIG. 4 is a proposed structure for α=1.0 for Hf,Cl.

A candidate structure that satisfies these observations is shown in FIG. 4, and comprises an isolated tetramer with Hf—Hf, and Hf—O distances taken from crystallography, and with chlorides placed around it in positions slightly different than those seen in the crystal structure. Since the average Hf—O distances in HOC and also in $HfO_2$ are the same, 2.14 Å, it is reasonable to assume that they will not be much different in the glass, even though bond angles may differ. The model has two types of chloride ion: an axial pair and four additional chlorides, in alternating pairs, slightly above and below the (approximate) plane of the tetramer. All of these are at Hf—Cl distances of 3.55 Å. This choice also reproduces the peak near 6.73 Å, as distance from a non-axial Cl to a distil Hf. The occupancy of these chlorides was set to ⅔ to make α=1.

The chloride ions in ZOC are well outside the tetrameric unit with the three shortest Zr—Cl distances being 4.5701, 4.5870, and 4.6057 Å. By contrast, the $ZrCl_4$ structure consists of interlocking $ZrCl_6$ octahedra[20], and the three shortest Zr—Cl distances are 2.307, 2.498, and 2.655 Å. Thus, there is effectively no Zr(Hf)—Cl interaction in MOC, but in the contracted state in glass, M-Cl bonds form, yielding M-Cl distances intermediate between the two. This is consistent with DSC findings. While the relative intensities of this model do not match perfectly with the experimental data, further investigations into the positions of chloride ions was not carried out as the reliability of PDF data with a $Q_{max}=14$ Å$^{-1}$ prevented a more thorough structural analysis. These data have demonstrated that chloride plays a major role in the crystallization of these compounds.

III. Synthesis

Several methods may be used to prepare solutions having α<2. The halogen portion of the halogenides typically is provided by an acid. A number of hydrohalic acids can be used, including hydrochloric acid (typically 36.5-38.0%), hydrobromic acid (typically about 48%), and hydriodic acid (typically about 57%). In some embodiments of the disclosed methods, ammonium hydroxide (typically 28-30%) is used to precipitate hydroxide. For certain exemplary embodiments, the materials used in synthesis were ACS AR grades.

A. Dissolution of Zirconium Basic Carbonate in Hydrochloric Acid (ZBC Series)

Zirconium basic carbonate (ZBC)(minimum specification of 40 weight % $(Zr+Hf)O_2$.) was used in some exemplary embodiments. Generally, Zr basic carbonate has 1 equivalent of HCl or $HNO_3$ added with a balance of deionized water and constant stirring at temperatures at or slightly above ambient (i.e., up to approximately 60° C.). The solid dissolves completely within 1 hour and then can be used for making thin films. For materials derived from ZBC, one can use an effective atomic weight of 92.2 for Zr+Hf, to reflect the common abundance of Hf, typically ≈2 wt % Hf/Zr. It dissolves, with evolution of $CO_2$, in dilute hydrohalic acid with molar ratio appropriate to the desired α. It can be beneficial to warm the acid, for example to approximately 50° C., to speed the dissolution which becomes progressively slower for lower values of α. Typically, 10 g of ZBC, assayed as 45% $(Zr+Hf)O_2$ is dissolved in a solution of (10 mL 2.02 M HCl+20 mL of 18.3 MΩ deionized water) to give a solution approximately 1M in Zr, with α=1. For some embodiments, this method has a limitation for α<~0.65, because only a negligible fraction of the ZBC dissolves. In some other embodiments, as α approaches≈0.5, insoluble particulates of hydroxide/oxide tend to form, representing a practical lower limit of α.

B. Dissolution of Precipitated Hydroxide in Hydrohalic Acid

In another example of the disclosed method, solutions of ZOC (solid, 99.9% metals basis) and HOC (solid, <1.5% Zr) are precipitated with excess ammonia, and the resulting wet cakes are filtered and/or centrifuged to remove the ammoniacal supernatant liquid; then re-pulped with water, and filtered; then repulped with 1% solution of the desired hydrohalic acid. Two such steps sufficed to leave the pH of the filtrate at a desired range of 1-3, although one skilled in the art will readily recognize that additional steps may be repeated to reach the desired pH. The wet cake was dissolved in the requisite quantity of hydrohalic acid for the intended α, where the quantity of acid is stochiometric with respect to the measured metal content, such as the zirconium content, of the processed precipitate.

C. Diffusion Dialysis of Solutions of ZOC, HOC

The use of diffusion dialysis to lower the acidity of ZOC solutions is known in the art. For the method described herein, damp crystals of received ZOC and HOC are allowed to evaporate away their recrystallization liquor (i.e., excess hydrochloric acid) so as to be assured of a starting solution with α=2.00. In one example, 10 mL increments of solutions of $M_{Zr,Hf}≈1.0$ are placed in 20 cm lengths of pre-wetted dialysis membrane tubes (Spectra/Por™, Standard RC Trial Kit Dialysis Membrane, Regenerated Cellulose, MWCO 3.5 kD) and the clamped tubes placed into a stirred beaker of deionized water of 20 or 30 times the volume of the parent ZOC or HOC solutions for specified times at ambient temperature. In this configuration, a substantial fraction of the chloride content diffuses into the water as hydrochloric acid, with small loss of metal values of 5 to 8%. Water counter-diffuses into the tube, diluting the solution. By proper choice of diffusion time and volume ratios, α values were controlled. A dialysis time of one hour, for example, for ZOC solutions suffices to give α≈1 for Zr, with slightly longer times for Hf. Adjusting dialysis time to achieve a desired α will be readily known to one skilled in the art. This method can also be applied to solutions of already-low α, for example prepared from ZBC. Indeed, this two-step method, ZBC to prepare α=0.75, followed by dialysis, is the most preferred route to α<0.6.

Table 3, below, shows densities for a few select crystalline phases, calculated from crystallographic data, as well as for glass counterparts with compositions as described in this present disclosure.

TABLE 3

Composition and Density for Some M, X Glasses

| M, X | α | n | FW g/mol | ρ g/cm³ | V̂ cm³/mol | RH % |
|---|---|---|---|---|---|---|
| Zr, Cl | | | | | | |
| ZOC | 2 | 7 | 323.1 | 1.896 | 170 | |
| Ideal | 1 | 3 | 232.6 | | | |
| | 0.53 | 1.47 | 196 | 2.51 | 78 | 36 |

TABLE 3-continued

Composition and Density for Some M, X Glasses

| M, X | α | n | FW g/mol | ρ g/cm³ | $\tilde{V}$ cm³/mol | RH % |
|---|---|---|---|---|---|---|
| | 0.58 | 1.59 | 200 | 2.60 | 77 | 28 |
| | 0.66 | 1.85 | 206 | 2.42 | 85 | 28 |
| | 0.70 | 1.57 | 201 | 2.59 | 78 | <20 |
| | 0.76 | 2.06 | 211 | 2.42 | 87 | 34 |
| | 0.81 | 2.31 | 217 | 2.35 | 92 | 32 |
| | 0.87 | 2.30 | 218 | 2.47 | 88 | 32 |
| | 0.96 | 2.78 | 227 | 2.39 | 95 | 32 |
| | 0.96 | 3.80 | 246 | 2.27 | 109 | 42 |
| | 0.98 | 2.93 | 231 | 2.17 | 107 | 32 |
| Zr, Br | | | | | | |
| ZOB* | 2 | 7 | 412.0 | 2.329 | 176.9 | |
| Ideal | 1 | 3 | 277.1 | | | |
| | 0.91 | 2.82 | 268 | 2.59 | 103 | 33 |
| Hf, Cl | | | | | | |
| HOC[9] | 2 | 7 | 409.4 | 2.439 | 167.9 | |
| Ideal | 1 | 3 | 318.9 | | | |
| | 1.11 | 3.28 | 326 | 2.98 | 109 | 33 |
| Hf, Br | | | | | | |
| Ideal | 1 | 3 | 363.4 | | | |
| | 1.05 | 3.31 | 372 | 3.16 | 118 | 42 |
| Zr, I | 2 | 7 | 505.2 | 2.697 | 187.3 | |
| ZOI* | | | | | | |
| Ideal | 1 | 3 | 324.1 | | | |
| | ~0.5 | — | 299 | 2.82 | 106 | 32 |

Uncertainty estimates: α, 0.01; n, 0.3; FW, 5; ρ, 0.02; $\tilde{V}$, 3.5

*Data for oxychloride phases from crystallographic sources.

Figure 5:
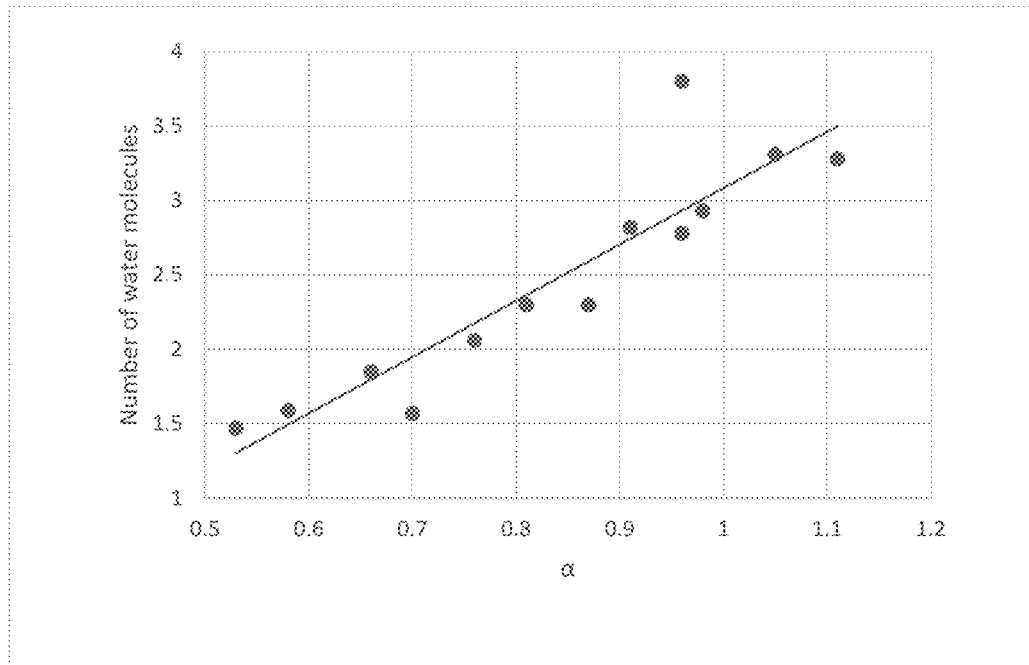
Figure 6:
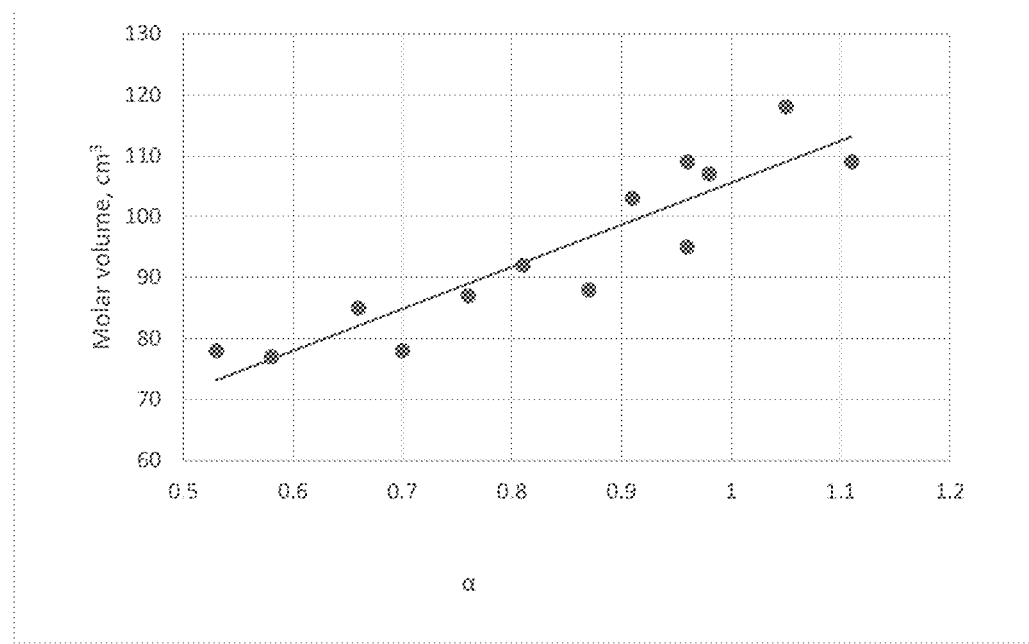

The number of water molecules and molar volumes as functions of α for all the glasses in Table 3 except for Zr,I, are plotted in FIGS. 5 and 6. The points which lie furthest offline were made at a relative humidity appreciably different from ≈30%. The trends suggest that the same behavior is found for all M and X.

Values for $\Delta\tilde{V}/\Delta\alpha$ were determined from the slopes of FIGS. 5 and 6, and $\Delta n/\Delta\alpha$, which form the quotient $(\Delta\tilde{V}/\Delta\alpha)/(\Delta n/\Delta\alpha) = \Delta\tilde{V}/\Delta n \approx (68.9)/(3.78) \approx 18.2$ (±5) cm³. This is a reasonable value for the partial molar volume of water in solution, and shows that the molar volume of the glass is calculable from water content in this range. Thus the "rule" of losing one halide, converting one water to hydroxide, and losing three more water molecules, not only describes the difference between ZOC and ideal glass, but also is valid within the glass homogeneity range. From literature values for $\tilde{V}$ for NaCl and NaOH, it was determined that $\Delta\tilde{V}(Cl^- \rightarrow OH^-) = -8.2$ cm³. Using the value of 18 cm³ for water, the expected molar volume for Zr(OH)$_3$Cl.3H$_2$O would be 170.4−8.2−3*18=108 cm³, compared to ≈110 cm³ indicated in Table 1.

The equation of the line in FIG. 5 is n=3.78*α−0.70. This serves as the basis for the assertion of the formula 4α-1 for n. Thus, n itself is implicitly determined by α. This also fits MOX, and allows representation of all halogenides as M(OH)$_{4-\alpha}$X$_\alpha$.(4α-1)H$_2$O.

Figure 7:
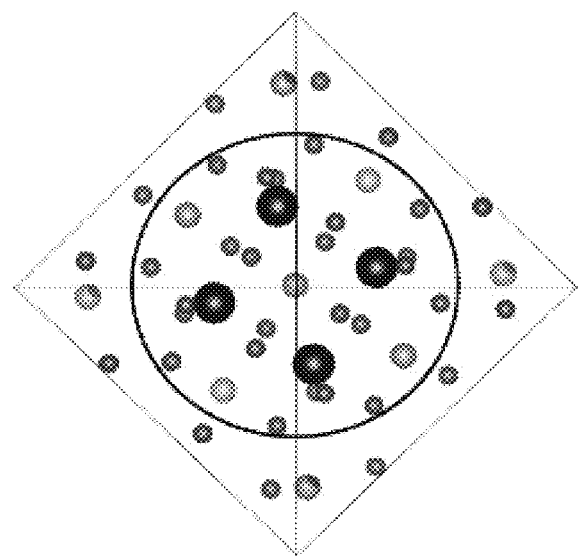
FIG. 7 provides the unit cell of ZOC, with circle of radius determined from glass molar volume.
Figure 8:
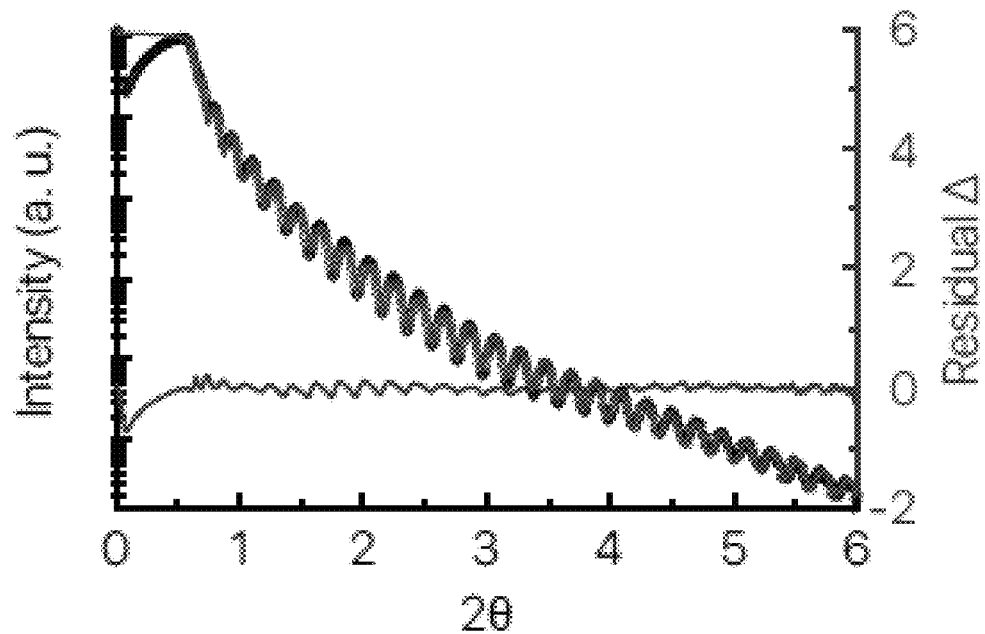
FIG. 8 provides X-ray reflectivity data and fit (red line) of an amorphous, solution-processed $ZrO_2$ film annealed at 400° C. The derived film density is 5.2 g/cm³, approximately 92% of single-crystal $ZrO_2$ density. The surface of the film is also very smooth, <0.4 nm rms roughness, as evidenced by the highly resolved oscillations (Kiessig fringes) that extend to 6° 2θ and beyond.
Figure 9:
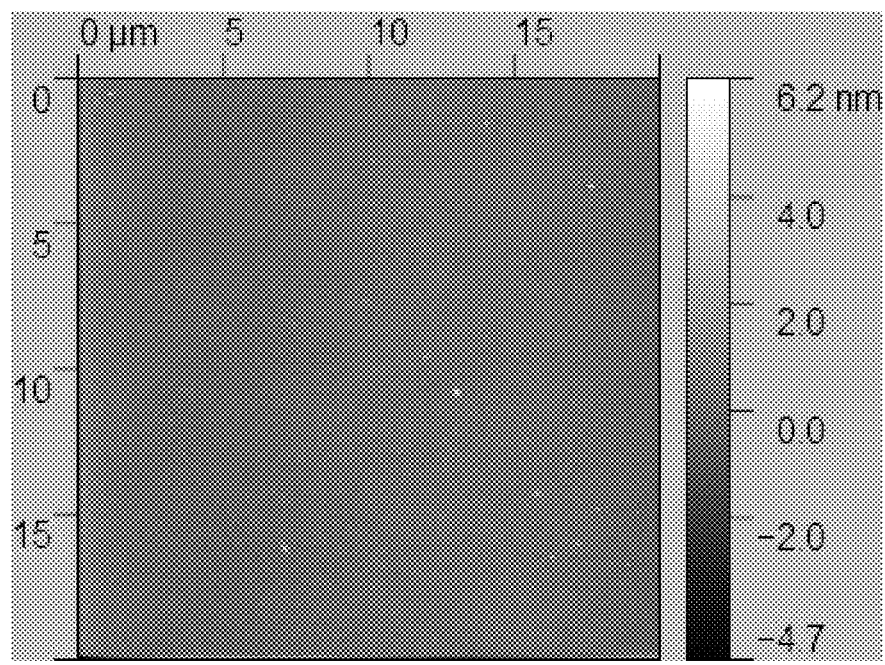
FIG. 9 is an AFM image illustrating surface smoothness of an exemplary $ZrO_2$ film. The white specs are dust and other contaminants while the majority of the surface is below the detection limit of the instrument.
Figure 10:
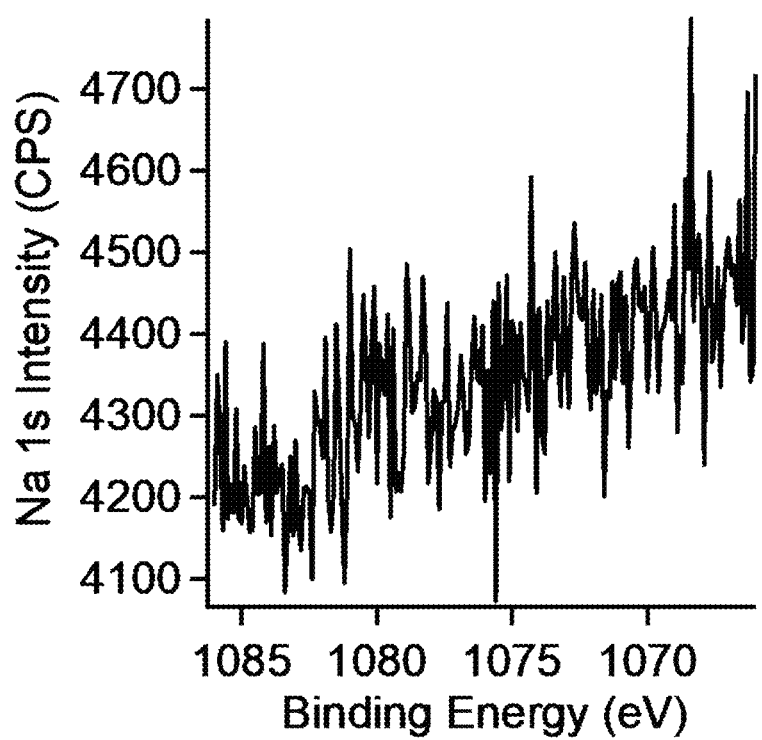
FIG. 10 shows XPS data for a sample of a 50 nm $ZrO_2$ film spun onto thermally-grown $SiO_2$ as a control, to check for sodium in the films prior to deposition on sodium borosilicate glass. $SiO_2$ is sodium free, and the presence of sodium was not expected in the film. This was the case: if sodium is present, a strong peak would appear in this region, and nothing indistinguishable from noise is visible.
Figure 11:
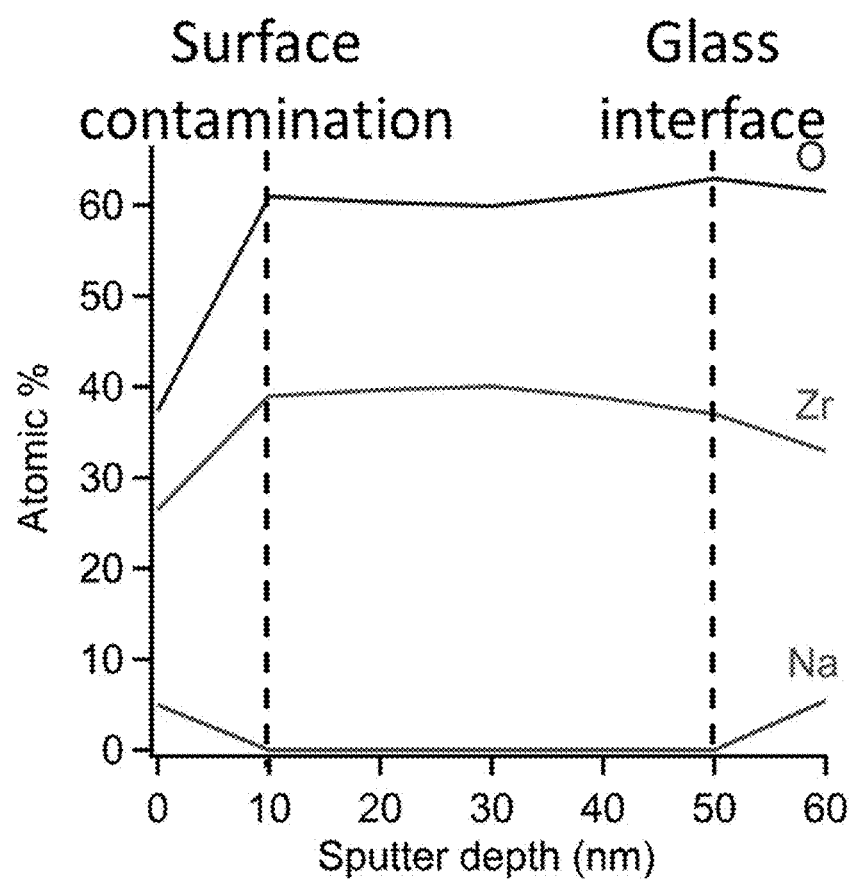
FIG. 11 provides sputter depth versus atomic % for an embodiment made comprising 50 nm of $ZrO_2$ spun onto sodium borosilicate glass and treated with a 500° C. anneal.

The density information is also used to calculate a contraction factor, defined as $(\tilde{V}_{glass}/\tilde{V}_{ZOC})^{1/3} = (\approx 110/170.4)^{1/3} \approx 0.86$, and draw a circle centered at the unit cell of ZOC normal to the c-axis, with radius=0.86$a_o$/2√2, as shown in FIG. 7. This encloses four times the ideal glass formula of atoms, or Zr$_4$(OH)$_8$(H$_2$O)$_{12}$Cl$_4$, or written for the ideal glass formula, Zr(OH)$_3$(H$_2$O)$_3$Cl (this count ignores the central Cl atom still pictured). This group may be referred to as the tetrameric motif. The three water molecules lost in this exclusion are just the three identified spectroscopically to leave in the 45-170° C. range, mediated by the change from chloride-hydrogen bonding to hydroxide-hydrogen bonding, instead of heating.

III. Thin Film Synthesis

In one embodiment, thin films of ZrO$_2$ and/or HfO$_2$ are deposited from the zirconium and/or hafnium halogenide solutions by spin coating. A precursor solution (α=0.9 to 1.1), preferably ZBC although dialysis precursors may also be used, is deposited on a hydrophilic substrate, for example ozone treated silicon, spinning at a few hundred to several thousand RPM, preferably at or around 3,000 RPM at ambient temperature and pressure for approximately 30 seconds. Deposited films are then briefly annealed, typically for approximately 15 minutes to up to an hour, at temperatures at or below 500° C. In some embodiments, the anneal temperature is at or below 400° C. In further embodiments, the anneal temperature may be at or below 300° C. At higher temperatures combined with longer anneal times, the thin films may start to crystallize. One skilled in the art will recognize that anneal duration and temperature can be optimized to fully densify the film while maintaining amorphous structure or achieving a desired amount of crystallization as may be preferable for certain applications.

The spin coat process can repeat multiple times until the desired film thickness is achieved. For the purpose of providing a sodium blocking layer, the thin film may have a thickness of approximately 10 to 100 nm, and in some embodiments the thin films may have a thickness from approximately 15 to 60 nm, or approximately 35 nm.

IV. Thin Film Properties

The thin-film solution processed thin films made using the dialyzed precursors produce ZrO$_2$ and/or HfO$_2$ films with densities >80% (most greater than 85%, similar to what is seen with sputter deposition). This is after a short (fifteen minute) annealing step, conducted in air, at 400° C. Some densification and crystallization may occur in the films at temperatures below 400° C. but this can be controlled by limiting the anneal duration. As measured by X-ray reflectometry (XXR) and atomic force microscopy (AFM), the thin films demonstrate high density and low surface roughness, respectively. In some embodiments, density is ≥85% and surface roughness is R$_q$<0.5 nm. In some further embodiments, density is ≥90% and surface roughness is R$_q$<0.3 nm.

To assess the ZrO$_2$ film as an alkali-metal diffusion barrier, conductivity and electron mobility data (via the Hall method) were collected on thin films of solution-deposited Sn:In$_2$O$_3$ (ITO). The ITO film was deposited on borosilicate glass with and without the ZrO$_2$ barrier layer in accordance with embodiments of the disclosed thin films. Distinct improvements in conductivity and mobility were observed with only 15 nm of ZrO$_2$ as a sodium blocking layer. Considering sodium ions may induce formation of electron traps, ITO's electron mobility drops sharply when sodium is present.

Specifically, with 0 nm ZrO$_2$ (i.e., no blocking layer), ITO on borosilicate glass had a measured resistivity of 2.2×10$^{-2}$ ohm and mobility of 4 cm²/V-s. With a 15 nm ZrO$_2$ thin film present as a sodium barrier, ITO on borosilicate glass has a resistivity of 1.0×10$^{-2}$ ohm and mobility of 9 cm²/V-S. With a 35 nm ZrO$_2$ thin film, ITO on borosilicate glass has a resistivity of 9.5×10$^{-3}$ ohm and mobility of 9 cm²/V-s. There are clear improvements in resistivity, but more importantly, the mobility more than doubles with the presence of the $ZrO_2$ blocking layer.

50 nm of $ZrO_2$ was deposited onto sodium borosilicate glass and treated with a 500° C. anneal. The sodium content of the glass was ~5%. In this particular sample, there is strong sodium surface contamination, likely due to sample handling (glass dust contamination from the cutting tool used to slice through the bulk glass sample and cut substrates into 1×1 cm sample sizes required for XPS most likely, due to the amount of sodium seen). A strong sodium signal is seen on the surface (<10 nm of film), which disappears with the first sputter step. Sodium content remains below the XPS detection limit until more than 50 nm of film have been sputtered away, at which point it returns to ~5% — the amount of sodium in the sodium borosilicate glass. The Zr signal also drops at this point, which demonstrates that the sodium seen here is due to the glass substrate being reached, and not diffusion.

V. Device Schematics

Figure 12:
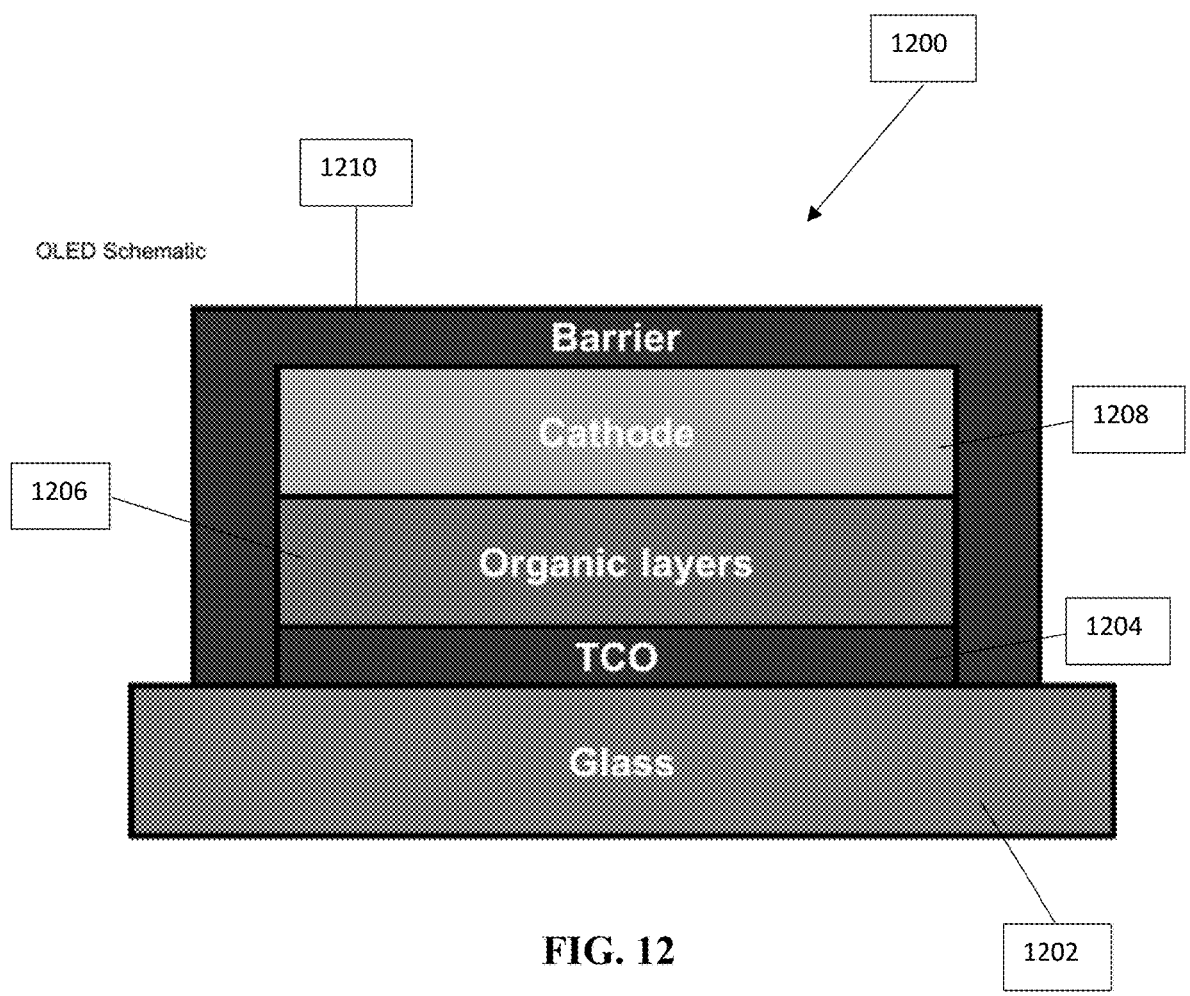
FIG. 12 is a schematic drawing of an organic light emitting diode (OLED).

A person of ordinary skill in the art will appreciate that the products, such as thin films, made herein can be used to make a number of useful devices. For example, such products can be used to form light emitting diodes, such as organic light emitting diodes. FIG. 12 provides a schematic drawing illustrating an exemplary OLED 1200. OLED 1200 comprises a substrate, such as a glass substrate 1202. A thin film conductive oxide (TCO) layer 1204 according to the present application is formed on the glass substrate 1202. An organic layer 1206 is then positioned adjacent to the TCO layer 1204. OLED 100 also includes a cathode 1208 and a barrier layer 1210.

Figure 13:
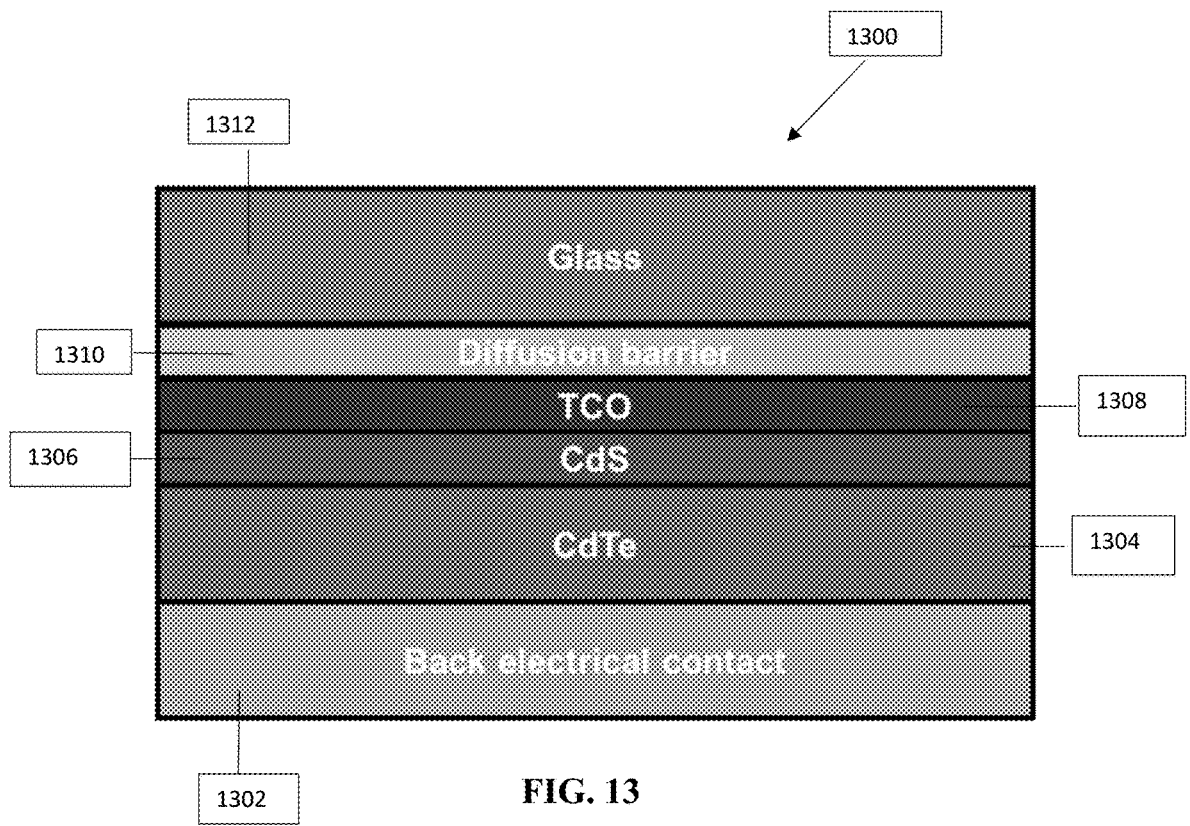
FIG. 13 is a schematic drawing of a solar device.

FIG. 13 illustrates an embodiment of a device 1300 comprising a TCO according to the present application that is useful for solar applications. Device 1300 includes a back electrical contact layer 1302, a CdTe layer 1304 and a CdS layer 1306 positioned adjacent to CdTe layer 1304. A TCO layer 1308 according to the present application is positioned adjacent to the CdS layer 1306. Device 1300 also includes a diffusion barrier 1310 and a glass substrate 1312. A Na blocking layer may be required for CdTe layer 1304, as Na diffusion may produce NaCl during annealing.

Figure 14:
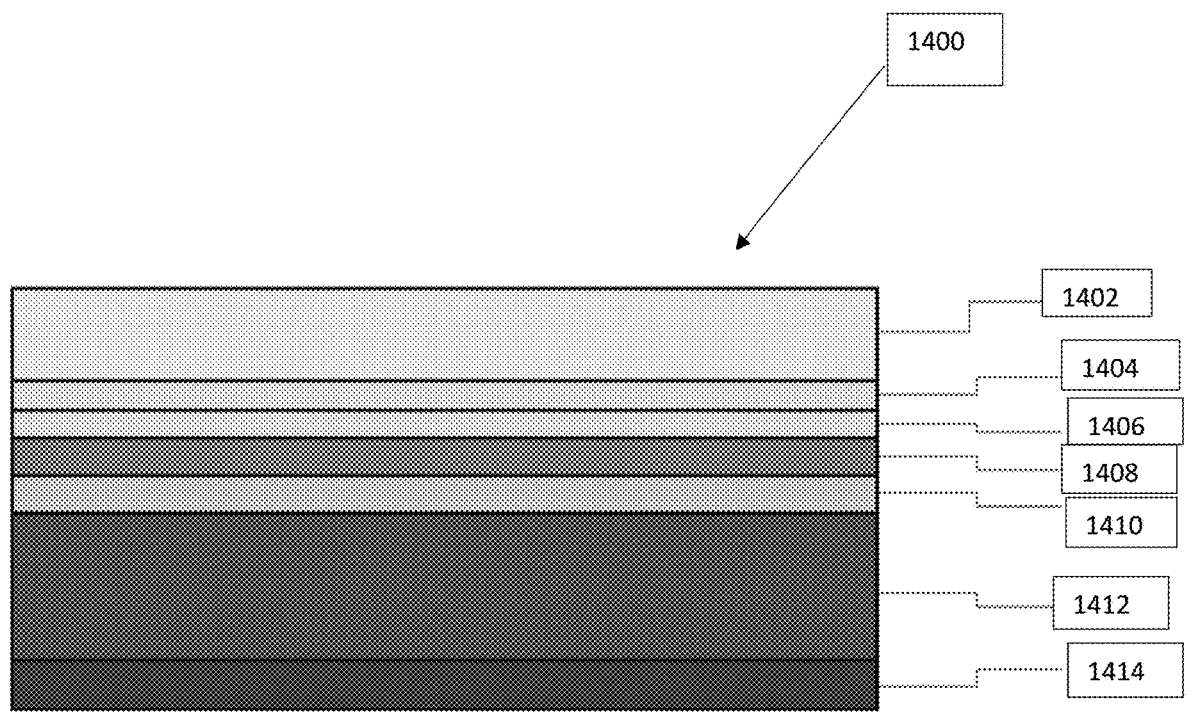
FIG. 14 is a schematic drawing of a CdTe solar cell comprising a metal oxide layer that can be prepared according to embodiments of the present invention.

FIG. 14 provides a schematic drawing of a CdTe solar cell 1400 comprising a metal oxide layer 1408 that can be prepared according to embodiments of the present invention. Solar cell 1400 comprises a substrate later 1402, such as a soda-lime substrate, an alkali diffusion layer 1404, and a color suppression layer 1406. A thin conductive metal oxide layer 1408, such as a $ZrO^2$ or $HfO_2$ layer produced according to embodiments of the present invention, is positioned adjacent to the color suppression layer 1406. CdTe solar cell 1400 further comprises a buffer layer 1410, a CdTe absorber layer 1412 and a back contact layer 1414.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An aqueous solution for depositing amorphous metal oxides as a diffusion barrier, the aqueous solution comprising a metal halogenide, or combinations of metal halogenides, wherein each halogenide has a formula $M(OH)_{4-\alpha}X_\alpha \cdot (4\alpha-1)H_2O$ where M is hafnium, zirconium or combinations thereof; X is Cl, Br or I; and $\alpha$ is from greater than 0.6 to 1.2.

2. The solution according to claim 1 where the halogenide structure comprises:
    4 linked tetramers and $\alpha$ is 1; or
    3 linked tetramers and $\alpha$ is 1.2.

3. A method, comprising:
    preparing an aqueous solution comprising a metal halogenide or combinations of metal halogenides, each halogenide having a formula $M(OH)_{4-\alpha}X_\alpha \cdot (4\alpha-1)H_2O$ where M=hafnium, zirconium or combinations thereof; X is Cl, Br or I; and a is from greater than 0.6 to 1.2;
    applying the solution to a substrate to form a film; and
    heating the film
    to provide a metal oxide film on the substrate.

4. The method according to claim 3 where X is Cl.

5. The method of claim 3 wherein the film is substantially amorphous.

6. The method of claim 3 wherein heating the film comprises annealing the film using an annealing time between 15 minutes and 1 hour, and an annealing temperature of from 300° C. to 500° C.

7. The method of claim 3 wherein the film has a roughness, Rq, of 1 nm or less.

8. The method according to claim 3, further comprising assembling a device incorporating the film.

9. A device made according to the method of claim 8.

10. A metal halogenide, or combinations of metal halogenides, wherein each halogenide has a formula $M(OH)_{4-\alpha}X_\alpha \cdot (4\alpha-1)H_2O$ where M=hafnium, zirconium or combinations thereof; X is Cl, Br or I; and a is from greater than 0.6 to 1.2.

11. A method for making a solution according to claim 1, comprising:
    forming a first solution comprising a source of zirconium, a source of hafnium, or combinations thereof; and
    processing the first solution to form a second solution comprising a halogenide having a formula $M(OH)_{4-\alpha}X_\alpha \cdot (4\alpha-1)H_2O$ where M=hafnium, zirconium or combinations thereof, X is Cl, Br or I, and a is from greater than 0.6 to 1.2.

12. The method according to claim 11, wherein:
    the first solution comprises zirconium oxychloride, hafnium oxychloride, or combinations thereof, the first solution having a first acidic pH; and
    processing comprises reducing acidity of the first solution to a second pH higher than the first pH by dialysis to form the second solution comprising the halogenide having the formula $M(OH)_{4-\alpha}X_\alpha \cdot (4\alpha-1)H_2O$ where M=hafnium, zirconium or combinations thereof; X is Cl, Br or I, and $\alpha$ is from greater than 0.6 to 1.2.

13. The method according to claim 11, wherein the first solution comprises zirconium oxychloride, hafnium oxychloride, or combinations thereof, and wherein processing comprises:
    treating the first solution with $NH_4OH$ to form a precipitate;
    washing the precipitate sufficiently to substantially completely remove chloride and ammonium ions; and
    dissolving washed precipitate with hydrochloric acid to form the second solution comprising the halogenide having the formula $M(OH)_{4-\alpha}X_\alpha \cdot (4\alpha-1)H_2O$ where M=hafnium, zirconium or combinations thereof; X is Cl, Br or I; and $\alpha$ is from greater than 0.6 to 1.2.

14. The method according to claim 11, wherein:
the first solution comprises zirconium basic carbonate, hafnium basic carbonate, or a combination thereof; and
processing comprises adding sufficient hydrochloric acid to form the second solution comprising the halogenide having the formula $M(OH)_{4-\alpha}X_\alpha \cdot (4\alpha-1)H_2O$ where M=hafnium, zirconium or combinations thereof; X is Cl, Br or I; and $\alpha$ is from greater than 0.6 to 1.2.

* * * * *